(12) United States Patent
Taomo et al.

(10) Patent No.: US 7,101,295 B2
(45) Date of Patent: Sep. 5, 2006

(54) POWER TRANSMISSION DEVICE AND PORTABLE POWER WORKING MACHINE PROVIDED WITH THE SAME

(75) Inventors: Toshio Taomo, Tokyo (JP); Fujio Kobayashi, Tokyo (JP)

(73) Assignee: Kioritz Corporation, Tokyo (JP)

( * ) Notice: Subject to any disclaimer, the term of this patent is extended or adjusted under 35 U.S.C. 154(b) by 353 days.

(21) Appl. No.: 10/640,083

(22) Filed: Aug. 13, 2003

(65) Prior Publication Data

US 2004/0033852 A1 Feb. 19, 2004

(30) Foreign Application Priority Data

Aug. 14, 2002 (JP) ............................. 2002-236278

(51) Int. Cl.
*F16H 7/14* (2006.01)
(52) U.S. Cl. ..................................... 474/117
(58) Field of Classification Search ................ 474/101, 474/109, 113, 117; 451/359; 125/13.01; 299/39.9
See application file for complete search history.

(56) References Cited

U.S. PATENT DOCUMENTS

| | | | | |
|---|---|---|---|---|
| 3,583,106 A | * | 6/1971 | Dobbertin | ................... 451/358 |
| 3,606,707 A | * | 9/1971 | Naslund | ..................... 451/439 |
| 3,893,240 A | * | 7/1975 | Morner et al. | ................. 30/390 |
| 4,977,708 A | | 12/1990 | Kloft | ............................ 51/170 |
| 5,174,029 A | | 12/1992 | Talberg | ....................... 30/386 |
| 5,177,871 A | * | 1/1993 | Martenson | .................... 30/122 |
| 5,533,585 A | * | 7/1996 | Kawano et al. | ............. 180/190 |
| 5,752,892 A | * | 5/1998 | Taomo et al. | ............... 474/112 |
| 6,374,501 B1 | * | 4/2002 | Claesson | ...................... 30/389 |

FOREIGN PATENT DOCUMENTS

| | | |
|---|---|---|
| JP | 57-026623 | 1/1982 |
| JP | 58-045216 | 1/1983 |
| JP | 4-104180 | 4/1992 |

* cited by examiner

*Primary Examiner*—Vicky A. Johnson
(74) *Attorney, Agent, or Firm*—Baker Botts L.L.P.

(57) ABSTRACT

A power transmission device is disclosed which is capable of easily, swiftly and appropriately altering the distance between the axes of a pair of transmission wheels such as pulleys, enabling an endless belt to be kept under constant and appropriate tension without necessitating a tension roller. This power transmission device comprises an endless belt wound around a pair of transmission wheels; and a cam-type adjusting mechanism which is interposed between a driving side supporting member and a driven side supporting member and configured to adjust a distance between the axes of the wheels. This cam-type adjusting mechanism comprises a supporting shaft secured to either the driving side supporting member or the driven side supporting member and disposed parallel to the rotational axes of the wheels; and a cam rotatably secured via a manipulating boss member to the supporting shaft.

9 Claims, 4 Drawing Sheets

POWER TRANSMISSION DEVICE AND PORTABLE POWER WORKING MACHINE PROVIDED WITH THE SAME

BACKGROUND OF THE INVENTION

1. Field of the Invention

The present invention relates to a power transmission device, and to a portable power working machine such as a concrete cutter, which is provided with such a power transmission device. In particular, the present invention relates to a power transmission device configured to perform the power transmission by means of a power transmission member such as an endless belt or an endless chain wound around a pair of transmission wheels such as pulleys or sprocket wheels to thereby interconnect the transmission wheels. The present invention also relates to a portable power working machine such as a concrete cutter, which is provided with the above-mentioned power transmission device.

2. Description of the Related Art

In the case of a portable power working machine such as a concrete cutter, a winding transmission type power working machine has been widely employed as a power transmission device for transmitting the power of a prime mover (internal combustion engine or electric motor) to a working member such as a cutter, wherein the power is transmitted by means of a power transmission member (such as a V-belt) which is disposed between and wound around a pair of transmission wheels (such as V-pulleys).

In the power transmission device of this type, the belt is required to be kept under a predetermined tension in order to minimize any loss in the transmission of motive power. For the purpose of meeting such a requirement, a belt structure with a tension roller has been proposed. However, in the case of portable power working machines where it is strongly desired to miniaturize and lighten the machine as much as possible, it may not be possible to install such a tension roller due to the limited space available in the machine. Further, since the initially set tension of the belt generally would gradually loosen due to the elongation or wear of the belt, depending on the duration or environments of use, the employment of only the aforementioned tension roller may not be sufficient in many cases.

With a view toward solving this problem, it has also been proposed to make the distance between the axes of a pair of pulleys (the distance of separation between rotational axes) adjustable to thereby enable the belt to be kept under a constant predetermined tension. As for the method of adjusting the distance between the axes of a pair of pulleys, movement of a supporting member supporting one of the pulleys in a direction orthogonal to the rotational axis of the pulley by way of so-called screw feeding using a threaded rod (bolt and the like) has been used in the past.

However, the aforementioned power transmission device where the distance between the axes of a pair of pulleys is made adjustable by way of the screw feeding using a threaded rod is problematic when exchanging the belt or adjusting the distance between the axes (the adjustment of the tension of the belt). Specifically, it takes a lot of time and trouble to loosen the number of bolts employed for fixing the supporting member as well as to suitably clamp or loosen the aforementioned threaded rod, etc. In particular, in a situation where a V-belt having a relatively large thickness is employed, one of the pulleys (or the supporting member) must be moved a fairly large amount (generally, 10 mm or so in distance) when exchanging the belt. In this example, according to the aforementioned screw feeding, even if the threaded rod is turned one revolution, the pulley can be moved by a small distance corresponding to only one pitch of the screw (1 mm or so, in general), so that the threaded rod must be rotated many revolutions when exchanging the used belt with a new belt. Moreover, the rotation of the threaded rod requires employment of tools such as a spanner or wrench. These tools can rotate only 90° at most in each rotating manipulation thereof as the further rotation of these tools is obstructed by the presence of, among other things, the aforementioned supporting member. Due to the limited rotating angle of these tools as mentioned above, these tools must be usually removed from the threaded rod before finishing the needed rotation of the threaded rod, thus requiring time-consuming manipulations of tools when exchanging the belt as well as taking a lot of time and trouble in the adjustment of the distance between the pair of axes as mentioned above.

Additionally, since the belt is mounted under a great amount of tension, a very large force is needed to rotate the threaded rod when making the aforementioned adjustment of the distance between the axes. At the same time, because the determination as to whether the degree of tension of the belt is appropriate is based largely on the operator's perception, the tension of the belt is liable to be either insufficient or excessive, thus making the operation of adjusting the distance between a pair of the axes difficult or troublesome.

BRIEF SUMMARY OF THE INVENTION

The present invention takes into account the aforementioned problems. Hence, an object of the present invention is to provide a power transmission device which is relatively simple in structure and is capable of easily, swiftly and appropriately altering the distance between the axes of a pair of transmission wheels such as pulleys, thereby enabling a power transmission member such as an endless belt to be kept under a constant and appropriate amount of tension without necessitating the employment of a tension roller. A further object of the present invention is to provide a portable power working machine that includes such a power transmission device.

With a view towards realizing the aforementioned object, a power transmission device is provided, according to the present invention, which basically comprises a driving side supporting member, a first transmission wheel supported by said driving side supporting member, a driven side supporting member supported by the driving side supporting member in a manner enabling the driven side supporting member to be movable in a direction orthogonal to the rotational axis of the first transmission wheel, a second transmission wheel supported by the driven side supporting member, a power transmission member having an endless loop configuration and which is wound around the first transmission wheel and the second transmission wheel to enable power transmission between the wheels, and a cam-type adjusting mechanism interposed between the driving side supporting member and the driven side supporting member and configured to adjust a distance between the axes of the first transmission wheel and the second transmission wheel.

More specifically, the aforementioned cam-type adjusting mechanism comprises a supporting shaft secured to either the driving side supporting member or the driven side supporting member and disposed parallel to the rotational axes of the first transmission wheel and the second transmission wheel, and a cam rotatably secured via a manipulating boss member for adjustment (hereinafter referred to simply as the "manipulating boss member") to the supporting shaft, wherein the driven side supporting member is enabled to move relative to the driving side supporting member by means of the cam in accordance with an angle of rotation of the manipulating boss member, thereby enabling alteration of a distance between the axes of the first transmission wheel and the second transmission wheel.

In an exemplary embodiment, the cam is formed of a plane cam which is externally fitted on the manipulating boss member, enabling the plane cam to be rotated integral with the manipulating boss member.

In another exemplary embodiment, the cam-type adjusting mechanism is provided with a biasing member for urging the driven side supporting member to move in a direction away from the first transmission wheel.

In a further exemplary embodiment, the cam-type adjusting mechanism comprises a supporting shaft secured to the driven side supporting member, a manipulating boss member rotatably supported by the supporting shaft, a plane cam fixed to the manipulating boss member in a manner to enable the plane cam to be rotated integral with the manipulating boss member, a follower member configured to be movable in a direction orthogonal to the rotational axis by means of the plane cam, and wherein the aforementioned biasing member comprises a compression coil spring interposed between the follower member and the driving side supporting member in a compressed state, for urging the follower member toward the cam.

Preferably, the cam-type adjusting mechanism is further provided with a marker that functions as a criterion for determining whether the distance between the aforementioned axes is appropriate.

According to exemplary embodiments of the present invention which are constructed as described above, the manipulating boss member having a hexagonal external configuration, for instance, and externally fitted with a plane cam such as an eccentric disk cam or a plate cam having an involute cam face is enabled to rotate through use of tools such as an L-shaped box wrench when exchanging the power transmission member such as an endless belt or when adjusting the tension of the power transmission member.

In this case, the supporting shaft on which the manipulating boss member is supported is disposed parallel with the rotational axis of the transmission wheel. In other words, since the supporting shaft protrudes perpendicular to the supporting member, the manipulating boss member as well as the tools are rotatable within a plane which is orthogonal to the aforementioned rotational axis. Therefore, tools are no longer required to be usually removed (for example, every 90° turn) from the manipulating boss member as conventionally required in the rotation of the manipulating boss member but rather can be turned to any desired angle at one time. Further, since the plane cam is designed to give a maximum amount of lift as it is turned up to an angle of one full rotation (360°), the manipulating (rotating) angle of the hexagonal manipulating boss member and the tools would no longer be required to rotate in excess of 360°.

As a result, as compared with the aforementioned conventional power transmission device wherein the distance between the axes is adjusted by way of screw feeding using a threaded rod, the amount of tool manipulation when exchanging the endless belt, for example, can be considerably minimized, and the distance between the axes of a pair of the transmission wheels such as pulleys can be altered more easily and in a more simple manner. As a result, the power transmission member such as an endless belt can be kept under a constant and appropriate amount of tension without necessitating the employment of a tension roller.

Further, when a biasing member for urging the driven side supporting member to move in a direction away from the first transmission wheel is installed as described above, this biasing means also functions to absorb not only the elongation and abrasion of the power transmission member such as an endless belt but also the looseness of various members, thereby making it possible to stably maintain a predetermined tension of the endless belt, etc. as compared with the case where no biasing means is installed. As a result, it is possible to improve not only the power transmission characteristics of the power transmission device but also the workability and durability of the portable working machine provided with this power transmission device. This is due in part to the biasing member also functioning as a cushioning material against mechanical shocks.

Furthermore, providing the cam-type adjusting mechanism with a marker, which functions as a criterion for determining whether the distance between the aforementioned axes is appropriate, makes it possible to avoid insufficient or excessive tensioning of the belt, thereby further enabling the aforementioned inter-axial distance-adjusting operation to be performed more easily, swiftly and appropriately.

The portable working machine according to the present invention employs the aforementioned power transmission device for transmitting motive power between a prime mover and a working member such as a cutter. As a result, it is now possible to provide a portable working machine which is not only more miniaturized in configuration and reduced in total weight but also improved in reliability.

BRIEF DESCRIPTION OF THE SEVERAL VIEWS OF THE DRAWINGS

For a more complete understanding of the present invention and the advantages thereof, reference may be made to the following description of exemplary embodiments thereof, taken in conjunction with the accompanying drawings, in which.

DETAILED DESCRIPTION OF THE INVENTION

Figure 1:
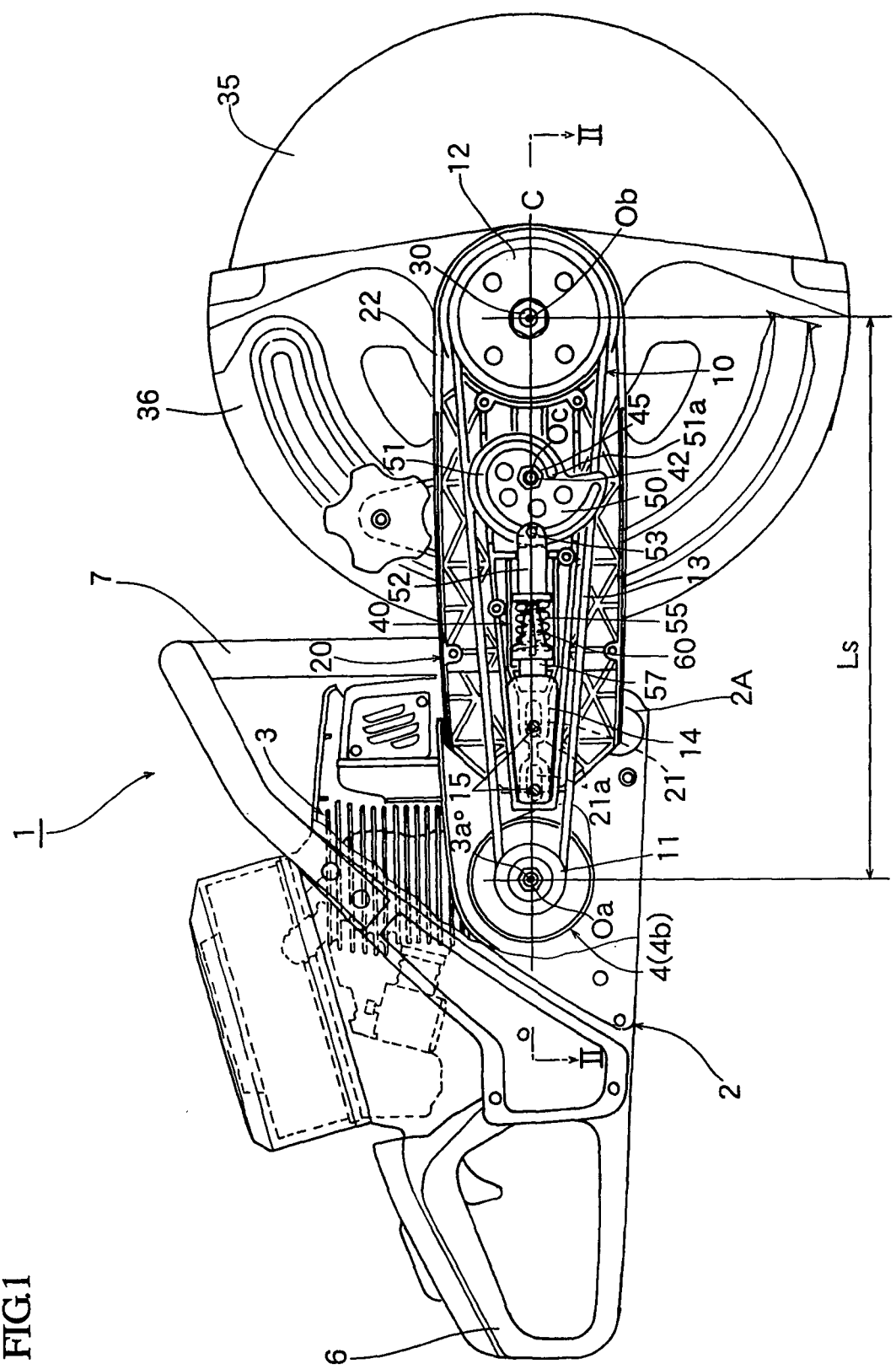
FIG. 1 is a right side view of a concrete cutter representing one embodiment of the portable power working machine which is provided with one embodiment of the power transmission device according to the present invention.
Figure 2:
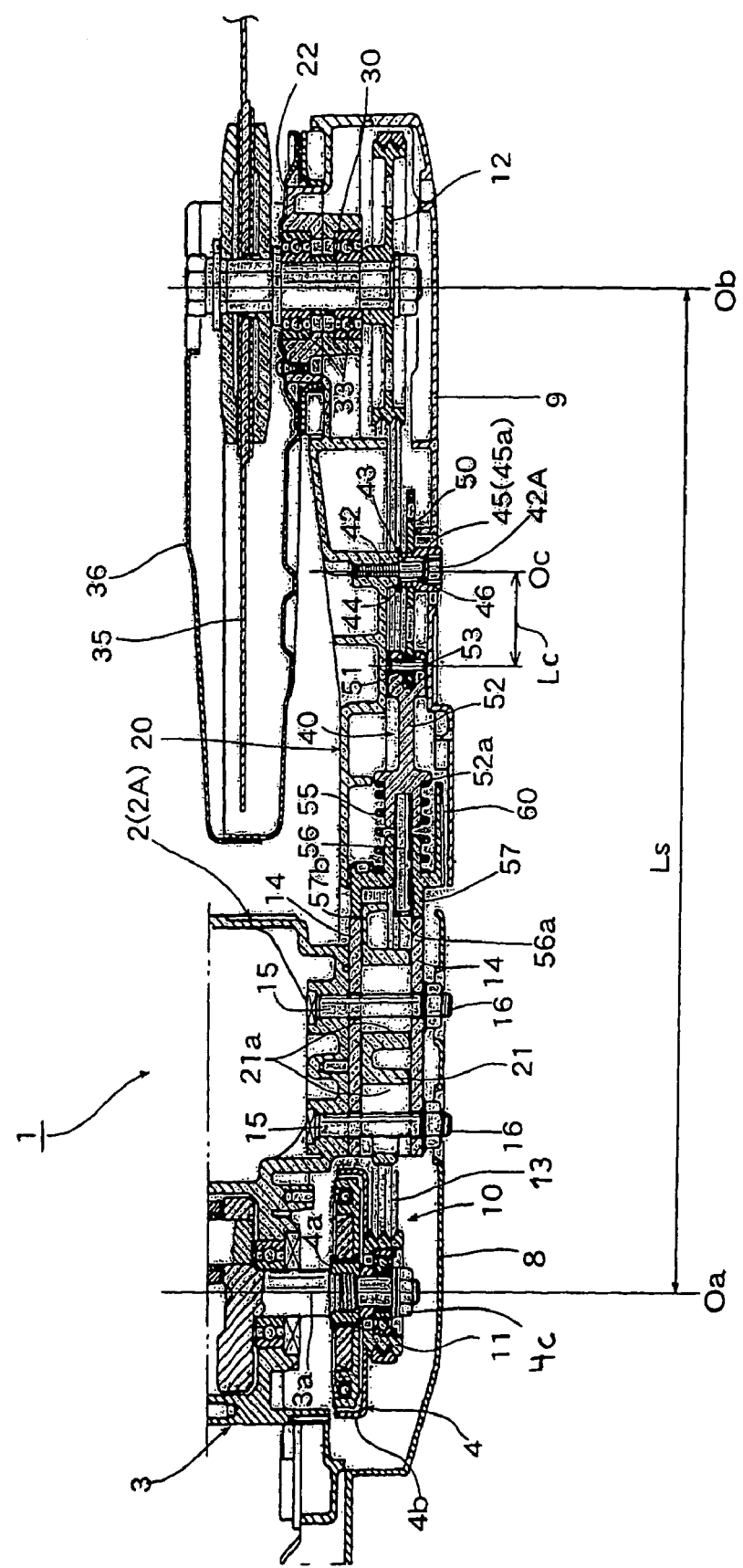
FIG. 2 is a sectional view taken along the line II—II of FIG. 1.

FIG. 1 shows an entire structure of the concrete cutter 1 excluding a right side body cover 8 (see FIG. 2) and a supporting arm cover 9 (see FIG. 2) both of which are removed for the convenience of explanation. This concrete cutter 1 is provided with a small air-cooled internal combustion engine 3 functioning as a prime mover and mounted inside the main housing 2 which is provided with a rear handle 6 and a front handle 7. Herein, this main housing 2 serves also as a driving side supporting member of the power transmission device 10 according to this embodiment. A boss 4a for mounting a centrifugal shoe of a centrifugal clutch 4 is externally and fixedly fitted on a crankshaft 3a of the engine 3 by a nut 4c. To a clutch drum 4b of this centrifugal clutch 4 is integrally attached a first pulley (multiple thread V pulley) 11 which constitutes part of the power transmission device 10.

Figure 3:
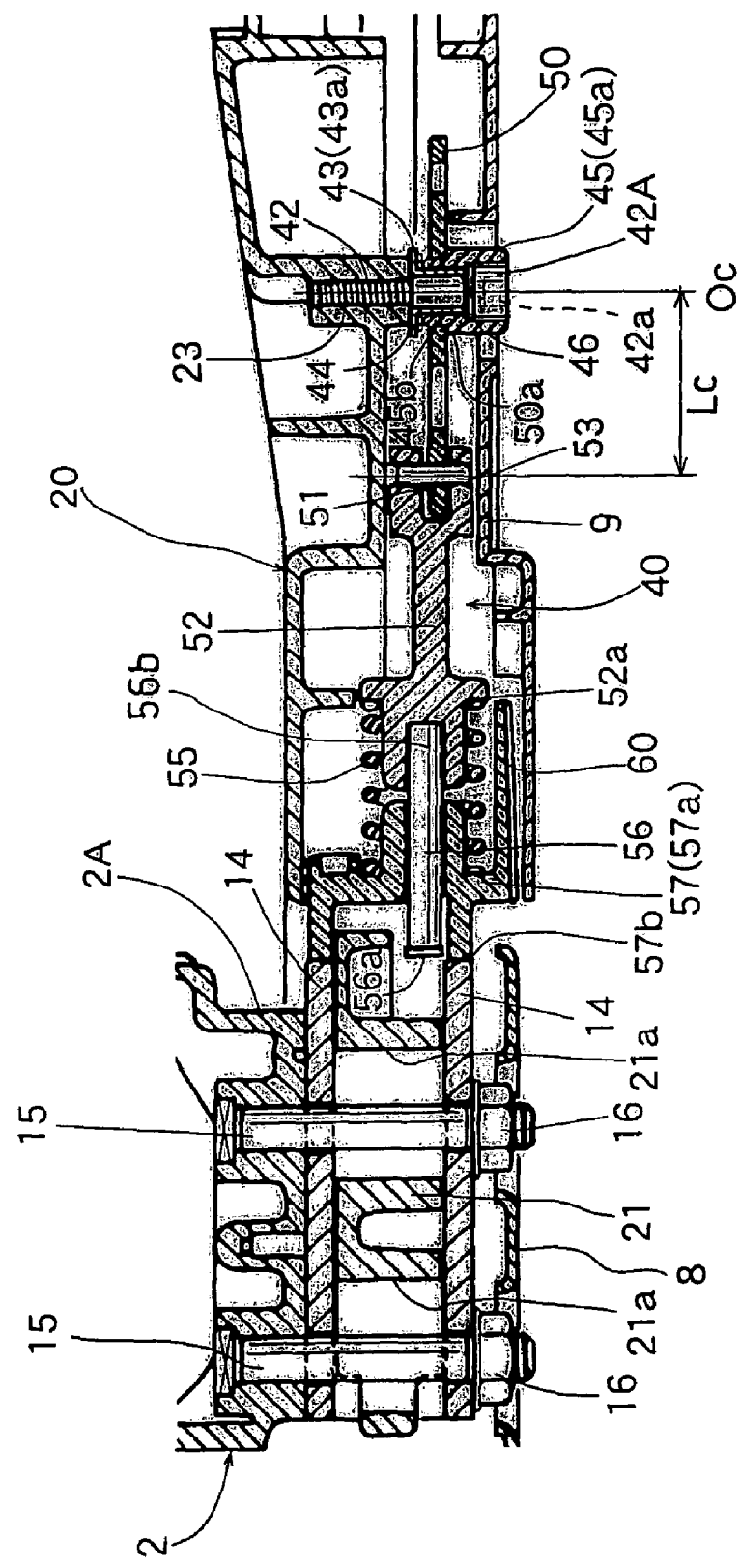
FIG. 3 is an enlarged sectional view of the cam-type adjusting mechanism shown in FIG. 2.

A distal end portion 21 of a supporting arm (a driven side supporting member) 20 having a groove-shaped or box-like configuration is supported on the fore-right side portion 2A of the main housing 2. This supporting arm 20 also serves as a driven side supporting member. Specifically, as depicted in FIG. 3 illustrating an enlarged view of the main portion of the concrete cutter, in addition to FIGS. 1 and 2, on the fore-right side portion 2A of the main housing 2 is a couple of stud bolts 15 disposed side by side along the length of the main housing and fixedly press-inserted into the fore-right side portion 2A. The distal end portion 21 of the supporting arm 20 is held between a pair of press-receiving members 14 and supported by these stud bolts 15. This distal end portion 21 is provided with a pair of slotted holes 21a for receiving the stud bolts 15, respectively. These slotted holes 21a are elongated along the length of the power transmission device. Each of these stud bolts 15 is designed to be screw-engaged with a nut 16 so as to press these press-receiving members 14 onto the distal end portion 21 of the supporting arm 20. Therefore, when the nuts 16 are loosened, the supporting arm 20 is permitted to slide in the elongated direction of the slotted holes 21a [(in a direction orthogonal to the rotational axis Oa of the first pulley 11 (or the central axis of the crankshaft 3a)] up to an extent within the range of the elongated length of the slotted holes 21a.

Further, at a distal end portion 22 of the supporting arm 20, supported, through a pair of ball bearings 33, is a rotational axis 30 which is disposed parallel with the aforementioned rotational axis Oa. On the right side of this rotational axis 30, there is externally and fixedly fitted a second pulley (a multiple thread V pulley, a second transmission wheel) 12 which is larger in diameter than that of the first pulley 11. The second pulley 12 also constitutes part of the power transmission device 10. A cutter 35 is externally and fixedly fitted on the left side of this rotational axis 30 mounted thereon as a working portion. Approximately half of this cutter 35 is covered with a semi-circular cutter cover 36. The setting angle of the semi-circular cutter cover 36 relative to the supporting arm 20 is designed to be altered depending on the working conditions of the concrete cutter.

A multiple thread V belt 13 is used to interconnect the first pulley 11 and the second pulley 12 as an endless loop power transmission member. The multiple thread V belt 13 is wound around these first and second pulleys 11 and 12. The power transmission device 10 is further provided, in addition to the first pulley 11, the second pulley 12 and the belt 13, with a cam-type adjusting mechanism 40 for adjusting the distance between the axes of the first pulley 11 and the second pulley 12 (a distance between the rotational axes Oa and Ob thereof), i.e. for adjusting the tension of the belt 13.

Figure 4:
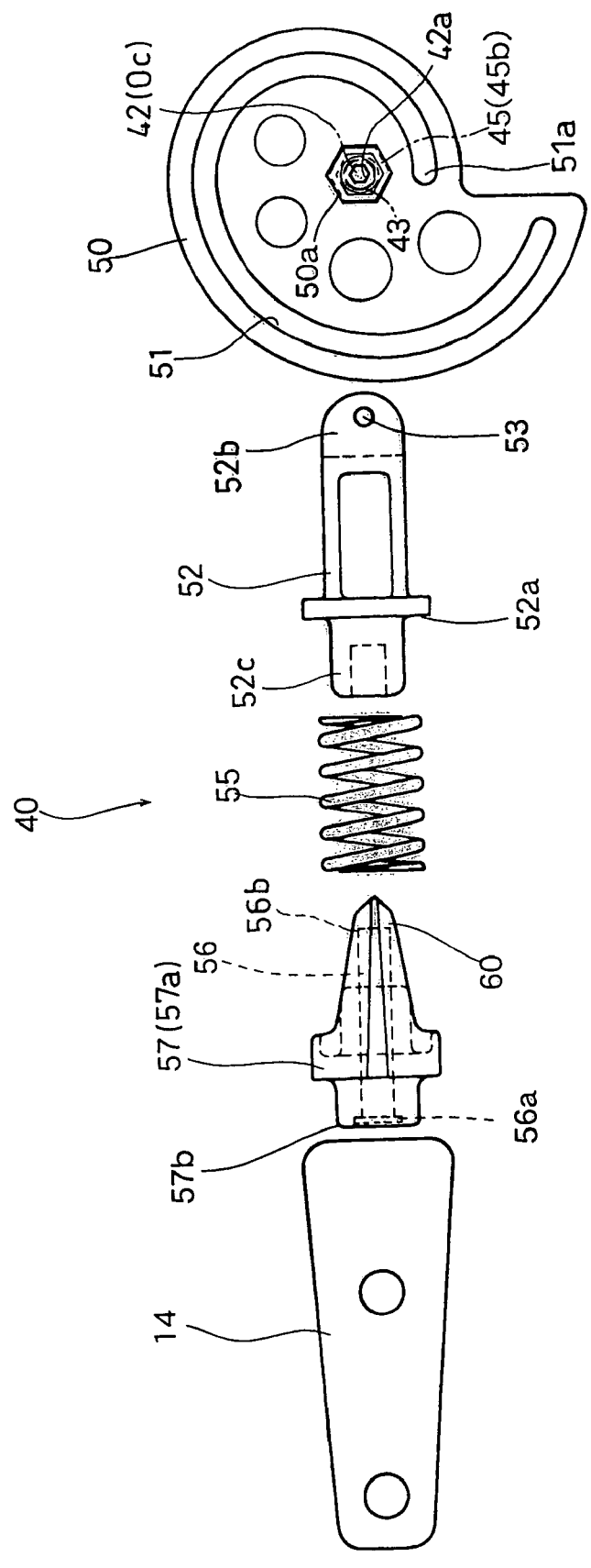
FIG. 4 is an enlarged exploded view of the cam-type adjusting mechanism shown in FIG. 1.

As shown in FIGS. 3 and 4, this cam-type adjusting mechanism 40 comprises a supporting shaft 42 formed of a hexagon socket (42a) head cap screw screwed into a tapped hole 23 which is lain on a straight line C connecting the rotational axis Oa with the rotational axis Ob, a manipulating boss member 45 having a hexagonal external configuration and a convex cross-section and rotatably supported by the supporting shaft 42, a plate cam (a plane cam) 50 representing one kind of plane cam and fixed to the hexagonal manipulating boss member 45 in a manner to enable it to be rotated integral with the hexagonal manipulating boss member 45, a follower member 52 which is designed to be moved in a direction orthogonal to the rotational axes Oa and Ob (along the straight line C) by means of the plate cam 50, a compression coil spring 55 interposed in a compressed state between the follower member 52 and the main housing 2, thus functioning as a biasing member, and a spring-receiving member 57 interposed between a couple of press-receiving members 14 fixedly secured to the main housing 2.

More specifically, the hexagonal manipulating boss member 45 comprises a rotating manipulation portion 45a having a hexagonal external configuration in cross-section adapted to be engaged with a tool such as an L-shaped box wrench, and a cam-fitting portion 45b having a hexagonal external configuration in cross-section which is smaller in diameter than that of the rotating manipulation portion 45a and formed contiguous downward to the rotating manipulation portion 45a. A cylindrical head portion 42A of the supporting shaft 42 is idly fitted in the rotating manipulation portion 45a, and a hexagonal fitting hole 50a formed in the plate cam 50 is externally fitted on the cam-fitting portion 45b (see FIG. 4).

A flanged collar 43 having a hat-shaped cross-section is externally fitted on an intermediate portion of the supporting shaft 42 and press-contacted via a washer 46 onto the tapped hole 23 by means of the head portion 42A of the supporting shaft 42. The cam-fitting portion 45b of the hexagonal manipulating boss member 45 is externally and rotatably fitted on this flanged collar 43. Further, due to the provision of this washer 46, the hexagonal manipulating boss member 45 is permitted to engage therewith and prevented from falling out of the supporting shaft 42. Between the cam-fitting portion 45b of the hexagonal manipulating boss member 45 and the flange portion 43a of the collar 43, a wave washer 44 is interposed for giving a suitable degree of rotational resistance therebetween and, at the same time, facilitating the rotation of the hexagonal manipulating boss member 45.

The plate cam 50 is provided with an involute cam groove (cam face) 51, into which a pin 53 that has been driven into a fore-end portion 52b of the follower member 52 is inserted. Further, the follower member 52 and the spring-receiving member 57 are provided with flange portions 52a and 57a, respectively, between which the aforementioned compression coil spring 55 is interposed. To a rear end portion 52c of the follower member 52 is fixedly secured, by way of press-insertion, a fore-end portion 56b of a flange (56a)-attached rod 56 on which the spring-receiving member 57 is externally and slidably fitted. The follower member 52, the compression coil spring 55, the spring-receiving member 57 and the rod 56 may be preliminarily fabricated as one integrally assembled body for the convenience of assembling the concrete cutter.

The rear end portion 57b of the spring-receiving member 57 is fastened by being press-contacted with a couple of the press-receiving members 14 which are fixedly attached to the main housing 2. The spring-receiving member 57 is further provided with a marker 60 having an arrow head configuration functioning as a criterion for determining whether the distance Ls between the aforementioned axes is appropriate. This marker 60 can be employed, for example, in such a way that when the distal end of this arrow head-shaped marker 60 is moved to reach the flange portion 52a of the follower member 52 (when viewed from the right side of the cutter), the distance Ls between the aforementioned axes (in other words, the tension of the V belt 13) is judged as being appropriate.

According to the power transmission device 10 of this embodiment constructed as described above, the hexagonal manipulating boss member 45 can be rotated through the use of tools such as an L-shaped box wrench when exchanging the V belt 13 or when adjusting the tension thereof.

In this embodiment, when the hexagonal manipulating boss member 45 is rotated counter-clockwise from the position shown in FIG. 1 after the nuts 16 of the stud bolts 15 have been loosened, the plate cam 50 is caused to rotate together with and in the same direction as the hexagonal manipulating boss member 45, thereby decreasing the distance Lc between the rotational axis Oc of the plate cam 50 and the pin 53 that has been inserted into the cam groove 51. As a result, the entire body of the supporting arm 20 including the second pulley 12 and the cam-type adjusting mechanism 40 is moved in a direction toward the first pulley 11. Also, the compression coil spring 55 is caused to extend, overall resulting in the shortening of the aforementioned inter-axial distance Ls, thus weakening the tension of the V belt 13. When the hexagonal manipulating boss member 45 is further rotated counter-clockwise so as to move the starting end portion 51a of the cam groove 51 up to the position where the pin 53 is located, the compression coil spring 55 is in a freely elongated state where the urging action to the plate cam 50 by the compression coil spring 55 is no longer effective, and the supporting arm 20 is also caused to move toward the first pulley 11. As a result, the aforementioned inter-axial distance Ls is minimized, thus loosening the V belt 13 and hence permitting the V belt 13 to be removed from the first pulley 11 and the second pulley 12. Accordingly, the V belt 13 can be exchanged for a new one.

Upon finishing the installation of the new V belt 13 by winding it around the first pulley 11 and the second pulley 12, the tension of this new V belt 13 is adjusted. When adjusting the tension of this new V belt, the hexagonal manipulating boss member 45 is rotated clockwise, i.e., in a direction opposite to that mentioned above. As a result, the plate cam 50 is also caused to rotate clockwise, thereby enlarging the distance Lc between the rotational axis Oc of the plate cam 50 and the pin 53 that is inserted into the cam groove 51. As a result, the compression coil spring 55 is compressed from its free state, and the entire body of the supporting arm 20 including the second pulley 12 and the cam-type adjusting mechanism 40 is moved in a direction away from the first pulley 11, thus expanding the aforementioned inter-axial distance Ls. When this turning of the hexagonal manipulating boss member 45 is continued until the distal end of this arrow head-shaped marker 60 is moved to reach the flange portion 52a of the follower member 52, the supporting arm 20 moves up to the position shown in FIGS. 1 and 2, thus giving an appropriate tension to the V belt 13. At this point, since the supporting arm 20 (the second pulley 12) is retained at a location where the urging force by the compression coil spring 55, compressed to such an extent as to turn it into a rigid body, is well-balanced with the tension of the V belt 13, there is little possibility of causing the adjusted tension to alter.

After this tension-adjusting manipulation, the nuts 16 of the stud bolts 15 are firmly fastened to integrally secure the supporting arm 20 to the main housing 2.

According to the power transmission device 10 which is constructed as described above, the hexagonal manipulating boss member 45 can be rotated by making use of tools such as an L-shaped box wrench when exchanging the V belt 13 or when adjusting the tension thereof.

In this embodiment, the supporting shaft 42 to which the hexagonal manipulating boss member 45 is attached is disposed parallel to the rotational axis Oa of the first pulley 11 as well as with the rotational axis Ob of the second pulley 12. Because the supporting shaft 42 protrudes perpendicular to the supporting arm 20, the hexagonal manipulating boss member 45 as well as the tools are permitted to be rotated within a plane which is orthogonal to the aforementioned rotational axes Oa and Ob. Therefore, tools are no longer required to be usually removed (for example, every 90° turn) from the hexagonal manipulating boss member 45 as is conventionally required in the rotation of the hexagonal manipulating boss member 45 but instead can be turned to any desired angle at one time. Further, since the plate cam 50 is designed to give a maximum amount of lift as it is turned up to an angle of one full rotation (360°), the manipulating (rotating) angle of the hexagonal manipulating boss member 45 and the tools would no longer be required to rotate more than 360°.

As a result, as compared with the aforementioned conventional power transmission device wherein the distance Ls between the axes is adjusted by way of screw feeding using a threaded rod, the amount of manipulating the tools when exchanging the endless belt, etc. can be considerably minimized, and the distance Ls between the axes of a pair of the pulleys 11 and 12 can be altered easily and swiftly and in a simple manner. As a result, the V belt 13 can be kept under a constant and appropriate tension without necessitating the employment of a tension roller.

Further, since the compression coil spring 55 is disposed in a manner that the longitudinal distance between the supporting arm 20 and the main housing 2 is urged to expand, this compression coil spring 55 also is able to absorb not only the elongation and abrasion of the V belt 13 but also the looseness of various members, thereby making it possible to stably maintain a predetermined tension of the V belt 13 as compared with the case where the compression coil spring 55 is not installed at all. As a result, it is possible to improve not only the power transmission characteristics of the power transmission device 10 but also the workability and durability of the concrete cutter 1 provided with this power transmission device 10. This is due to the provision of this compression coil spring 55 functioning also as a cushioning material against mechanical shocks.

Furthermore, since the cam-type adjusting mechanism 40 is further provided with a marker 60 having an arrow head configuration functioning as a criterion for determining whether the distance Ls between the aforementioned axes is appropriate, it is possible to avoid insufficient or excessive tension of the V belt 13, thereby further enabling the aforementioned inter-axial distance(Ls)-adjusting operation to be performed more easily, swiftly and appropriately.

Furthermore, according to the concrete cutter 1 of this embodiment, since the power transmission device 10 having the aforementioned functions and effects is employed for transmitting motive power between the engine 3 and a working member such as the cutter 35, it is now possible not only to make it miniaturized in configuration and reduced in total weight but also to improve its reliability.

While in the foregoing one embodiment of this invention has been explained in details for the purpose of illustration, it will be understood that the construction of the device can be varied without departing from the spirit and scope of the invention.

As apparent from above explanation, the power transmission device of the present invention is relatively simple in structure and capable of easily, swiftly and appropriately altering the distance between the axes of a pair of transmission wheels such as pulleys, thereby enabling a power transmission member such as an endless belt to be kept under a constant and appropriate tension without necessitating the employment of a tension roller.

Furthermore, since the power transmission device according to the present invention is employed for transmitting motive power between a prime mover and a working member such as a cutter, it is now possible to provide a portable working machine which is not only miniaturized in configuration and reduced in total weight but also improved in reliability.

What is claimed is:

1. A power transmission device comprising:
   a driving side supporting member;
   a first transmission wheel supported by said driving side supporting member;
   a driven side supporting member supported by said driving side supporting member in a manner enabling said driven side supporting member to be moved in a direction orthogonal to the rotational axis of said first transmission wheel;
   a second transmission wheel supported by said driven side supporting member;
   a power transmission member having an endless loop configuration which is wound around said first transmission wheel and said second transmission wheel to enable power transmission between said first and second transmission wheels; and
   a cam-type adjusting mechanism interposed between said driving side supporting member and said driven side supporting member and configured to adjust a distance between axes of said first transmission wheel and said second transmission wheel;
   said cam-type adjusting mechanism comprises
      a supporting shaft secured to said driven side supporting member and disposed parallel to the rotational axes of said first transmission wheel and said second transmission wheel;
      a manipulating boss member rotatably supported by the supporting shaft; and
      a cam rotatably secured via the manipulating boss member to said supporting shaft, the cam being supported by the manipulating boss member in a manner to enable said cam to be rotated integral with said manipulating boss member, the cam comprising an involute cam groove;
      a follower member configured to be moveable in a direction orthogonal to said rotational axis by said cam, the follower member being adapted to be moved toward a direction perpendicular to the rotational axis via the involute cam groove;
      a biasing member for urging said driven side supporting member in a direction away from said first transmission wheel, said biasing member including a compression coil spring interposed between said follower member and said driving side supporting member in a compressed state, for urging said follower member toward said cam;
   wherein said driven side supporting member is moveable relative to said driving side supporting member by said cam in accordance with an angle of rotation of said manipulating boss member, thereby enabling alteration of a distance between the axes of said first transmission wheel and said second transmission wheel.

2. The power transmission device according to claim 1, wherein said cam comprises a plane cam.

3. The power transmission device according to claim 1, wherein said cam-type adjusting mechanism further comprises a marker for determining whether the distance between the axes is appropriate.

4. A portable power working machine comprising:
   a power transmission device employed for transmitting motive power between a prime mover and a working member;
   said power transmission device comprising:
      a driving side supporting member;
      a first transmission wheel supported by said driving side supporting member;
      a driven side supporting member supported by said driving side supporting member in a manner enabling said driven side supporting member to be moved in a direction orthogonal to the rotational axis of said first transmission wheel;
      a second transmission wheel supported by said driven side supporting member;
      a power transmission member having an endless loop configuration which is wound around said first transmission wheel and said second transmission wheel to enable power transmission between said first and second transmission wheels; and
      a cam-type adjusting mechanism interposed between said driving side supporting member and said driven side supporting member and configured to adjust a distance between axes of said first transmission wheel and said second transmission wheel;
      said cam-type adjusting mechanism comprises
         a supporting shaft secured to said driven side supporting member and disposed parallel to the rotational axes of said first transmission wheel and said second transmission wheel;
         a manipulating boss member rotatably supported by the supporting shaft; and
         a cam rotatably secured via the manipulating boss member to said supporting shaft, the cam being supported by the manipulating boss member in a manner to enable said cam to be rotated integral with said manipulating boss member, the cam comprising an involute cam groove;
         a follower member configured to be moveable in a direction orthogonal to said rotational axis by said cam, the follower member being adapted to be moved toward a direction perpendicular to the rotational axis via the involute cam groove;
         a biasing member for urging said driven side supporting member in a direction away from said first transmission wheel, said biasing member including a compression coil spring interposed between said follower member and said driving side supporting member in a compressed state, for urging said follower member toward said cam;
      wherein said driven side supporting member is moveable relative to said driving side supporting member by said cam in accordance with an angle of rotation of said manipulating boss member, thereby enabling alteration of a distance between the axes of said first transmission wheel and said second transmission wheel.

5. The portable power working machine according to claim 4, wherein said cam comprises a plane cam.

6. The portable power working machine according to claim 4, wherein said cam-type adjusting mechanism further comprises a marker for determining whether the distance between the axes is appropriate.

7. A power transmission device comprising:
   a driving side supporting member;

a first transmission wheel supported by said driving side supporting member;

a driven side supporting member supported by said driving side supporting member in a manner enabling said driven side supporting member to be moved in a direction orthogonal to the rotational axis of said first transmission wheel;

a second transmission wheel supported by said driven side supporting member;

a power transmission member having an endless loop configuration which is wound around said first transmission wheel and said second transmission wheel to enable power transmission between said first and second transmission wheels; and an adjusting mechanism interposed between said driving side supporting member and said driven side supporting member and configured to adjust a distance between axes of said first transmission wheel and said second transmission wheel;

said adjusting mechanism comprises a supporting shaft secured to said driven side supporting member and disposed parallel to the rotational axes of said first transmission wheel and said second transmission wheel;

a manipulating boss member rotatably supported by the supporting shaft; and a cam rotatably secured via a the manipulating boss member to said supporting shaft, the cam being supported by the manipulating boss member in a maimer to enable said cam to be rotated integral with said manipulating boss member, the cam comprising an involute cam groove;

a follower member configured to be moveable in a direction orthogonal to said rotational axis by said cam, the follower member being adapted to be moved toward a direction perpendicular to the rotational axis via the involute cam groove;

a biasing member for urging said driven side supporting member in a direction away from said first transmission wheel, said biasing member including a compression coil spring interposed between said follower member and said driving side supporting member in a contracted state, for urging said follower member toward said cam;

wherein said driven side supporting member is moveable relative to said driving side supporting member by said cam in accordance with an angle of rotation of said manipulating boss member, thereby enabling alteration of a distance between the axes of said first transmission wheel and said second transmission wheel.

8. The power transmission device according to claim 7, wherein said adjusting mechanism further comprises a marker for determining whether the distance between the axes is appropriate.

9. The portable power working machine according to claim 8, wherein said cam comprises a plane cam.

* * * * *